Nov. 28, 1967  P. A. MINNICK  3,354,717
HOT WIRE ANEMOMETERS
Filed June 23, 1965
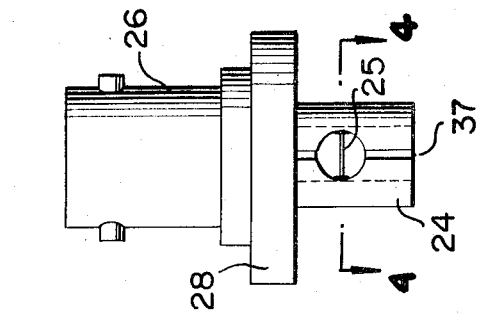
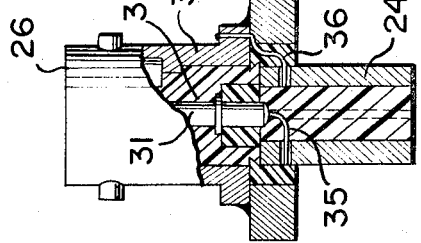
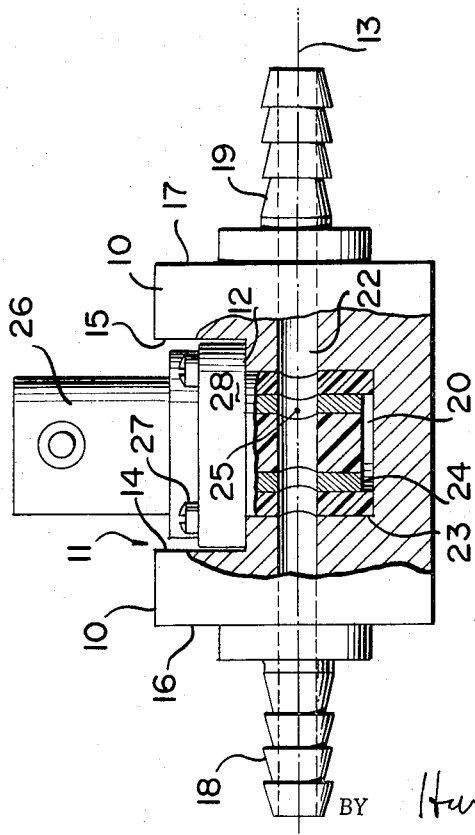
INVENTOR
PASCO A. MINNICK
BY *Hurvitz & Rose*
ATTORNEYS

United States Patent Office 3,354,717
Patented Nov. 28, 1967

3,354,717
HOT WIRE ANEMOMETERS
Pasco A. Minnick, Arlington, Va., assignor to Bowles Engineering Corporation, Silver Spring, Md., a corporation of Maryland
Filed June 23, 1965, Ser. No. 466,171
1 Claim. (Cl. 73—204)

ABSTRACT OF THE DISCLOSURE

A hot wire of gold plated tungsten is connected to a modified BNC coaxial connector, which provides electrical terminals for the wire. The wire is secured to a split metallic sleeve, extending between the halves thereof, so that only the length of wire which subsists in the slot formed by the split operates an an effective hot wire. Thereby, wire resistance is established, and wires can be replaced without changing wire resistance.

The present invention relates generally to hot wire anemometers and more particularly to hot wire anemometers which are arranged for easy and inexpensive fabrication and repair.

Hot wire anemometers are well known instrumentalities for measuring the flow of gases. Essentially a hot wire anemometer system includes a wire which changes resistance as a function of temperature, means for heating the wire to a known temperature, the wire having known resistance at that temperature, means for flowing a fluid over the wire or in heat transfer relation thereto, which cools the wire, and means for either measuring the change in resistance which occurs when the wire is cooled by the flow, or for measuring the electrical power which must be supplied to the wire to maintain its resistance constant during said flow. Heat abstracted from the wire by the flow is then a function of mass flow of the fluid, so that mass flow can be measured in terms of an electrical quantity, by means of the system.

Problems arise, in hot wire anemometers, in respect to reproducibility, both in manufacture and repair. Reproducibility is largely a function of hot wire length, so that means must be provided for assuring that the hot wire shall be of a given length, when installed. A typical wire may be fabricated of gold plated tungsten, and may be about 90 microinches in diameter and .125 inch long, to provide a resistance of 50 ohms. According to the invention the wire is connected to a modified BNC coaxial connector, which in turn provides suitable electrical terminals for the wire. The wire itself is secured within a split metallic sleeve, extending between the halves thereof, so that only the length of wire which subsists internally of the halves operates as an effective hot wire. The sleeve has a diametral hole of .125 D, extending parallel to its slots. The wire is soldered diametrically of the hole, extending perpendicularly of the slots. Since the wire length and the hole diameter are equal, the wire can readily be positioned so that its ends conjoin with the wall of the hole, which establishes wire resistance. A wire can readily be removed and a new duplicate wire inserted, and the operation is inherently accurate. No other repairs are required since all components other than the wire are rugged and largely of metal.

It is, accordingly, an object of the invention to provide a novel hot wire anemometer, which can be readily repaired by replacing its wire, which is rugged, cheaply manufacturable and reproducible and which maintains its calibration despite rough handling, shock and vibration.

The above and still further objects, features and advantages of the present invention will become apparent upon consideration of the following detailed description of one specific embodiment thereof, especially when taken in conjunction with the accompanying drawing, wherein:

FIGURE 1 is a view in plan, partly broken away, to show a section of an instrument according to the invention;

FIGURE 2 is a view in section, as viewed laterally, of a connector and sleeve sub-assembly, employed in the instrument of FIGURE 1; and FIGURE 3 is a view in elevation of the sub-assembly of FIGURE 2.

FIGURE 4 is a view in section taken on line 4—4 of FIGURE 3.

In FIGURE 1, 10 is a metallic cylindrical body, having a slot 11 milled therein. The cylinder may be of ¾" OD and a length of 1". The slot may have a bottom wall 12 which extends parallel to the axis 13 of the cylindrical body and side walls 14 and 15 which extend parallel to the ends 16, 17 of the cylindrical body. Standard fluid nipples 18, 19 extend in opposite directions from the cylindrical body 10, and are integral therewith.

A well 20 extends into the body 10, perpendicular of the bottom 12 of slot 11, to a depth well beyond the axis, i.e., .350", and a through hole 22 for fluid extends through the nipples 18, 19 and the body 10, on the axis 13, thus intersecting the well 20.

Located snugly within well 20 is a cylindrical insulator 23, and a split sleeve 24, on the latter being mounted a hot wire 25. Sleeve 24 is secured by epoxy to a modified BNC connector 26, and fits snugly within insulator 23, but does not extend into contact with body 10 at the bottom of well 20. The connector 26 is secured to a base 28, as is the split sleeve 24, and the base 28 is secured to the bottom 12 of slot 11 by means of bolts 27. Hole 22 extends through split sleeve 24, and in fact, the hole 22 is drilled after assembly of all elements of the system except the hot wire 25. The latter is included as the last step of the fabrication process, after disassembly.

The connector 26, FIGURE 2, is coaxial and includes an outer conductor 30, an inner concentric conductor 31 and an insulator 32 therebetween. The connector 26 is secured to base 28 by epoxy. The split sleeve 24 is positioned coaxially of the center conductor 31, but bears against the insulator 32 of the connector 26. A wire 35 extends from an opening in one half the split sleeve 24 to center conductor 31, and another wire 36 extends from the outer conductor 30 to the other half of the split sleeve 24. Epoxy then is run into the interior of the split sleeve 24 and the split itself, and into the space between the split sleeve 24 and the base 28 and into any available space in the connector 26, to provide a solid, rigid insert. The latter is now secured to body 10 and hole 22 is drilled. The insert is then removed for installation of hot wire 25 as shown in FIGURE 3 by soldering the tungsten wire (gold plated) across the center line of the hole 22 to the two halves of the sleeve 24. The slot 37, which extends parallel to axis 13, maintains electrical isolation of the ends of the wire 25, while the sleeve provides connections from these ends to the connector 26.

While I have described and illustrated one specific embodiment of my invention, it will be clear that variations of the details of construction which are specifically illustrated and described may be resorted to without departing from the true spirit and scope of the invention as defined in the appended claim.

What I claim is:

A hot wire anemometer, comprising a metallic body having an axis, a well extending into said body and intersecting said axis, a split metallic cylinder located within said well, means insulating said split metallic cylinder from said body,
a cylindrical hole extending through said body and said split metallic cylinder,
nipples incorporated in said body for leading fluid to and from said hole,
said split metallic cylinder being so oriented in said well that said hole extends partially through each of the halves of said spilt metallic cylinder,
a coaxial connector insulatedly secured to said split metallic cylinder and coaxial therewith,
said coaxial connector having a central axial conductor and a surrounding conductor,
a wire lead connecting said central conductor electrically to one of said halves,
a further wire lead connecting said surrounding conductor to the other of said halves,
a tungsten wire connected between said halves within said hole, said tungsten wire having a length approximately equal to the diameter of said hole, and
means detachably securing said coaxial connector to said body.

References Cited
UNITED STATES PATENTS 2,951,659    9/1960    Yoler _____ 73—204 X

OTHER REFERENCES

Shepard, C. E. "A Self-Excited Alternating-Current, Constant-Temperature Hot-Wire Anemometer." National Advisory Committee for Aeronautics Technical Note, NACA TN3406. April 1955. Page 20 relied on.

JAMES J. GILL, *Primary Examiner.*

RICHARD C. QUEISSER, *Examiner.*

J. C. GOLDSTEIN, C. A. RUEHL, *Assistant Examiners.*